March 6, 1934. W. R. HUME 1,949,685
AUTOMATIC CONTROL DEVICE FOR ELECTRIC ARC WELDING AND OTHER APPARATUS
Filed Feb. 2, 1932 2 Sheets-Sheet 1

Inventor:
Walter R. Hume
by
Attorney

March 6, 1934.  W. R. HUME  1,949,685
AUTOMATIC CONTROL DEVICE FOR ELECTRIC ARC WELDING AND OTHER APPARATUS
Filed Feb. 2, 1932  2 Sheets-Sheet 2

Inventor:
Walter R. Hume
By [signature]
Attorney

Patented Mar. 6, 1934

1,949,685

UNITED STATES PATENT OFFICE 1,949,685

AUTOMATIC CONTROL DEVICE FOR ELECTRIC ARC WELDING AND OTHER APPARATUS

Walter Reginald Hume, Melbourne, Victoria, Australia, assignor to Hume Steel Limited, Melbourne, Victoria, Australia, a company of Victoria, Australia Application February 2, 1932, Serial No. 590,504
In Australia September 30, 1931

13 Claims. (Cl. 219—8)

This invention relates to electro-magnetic control devices particularly suitable for automatically controlling the feed movement of the electrode or of the work in electric arc welding apparatus but also applicable for use in other apparatus wherein it is desired to automatically control the operation of some part or element thereof in accordance with fluctuations in an electric circuit.

The invention aims at the provision of an extremely simple, reliable and sensitive electro-magnetic control device for the purpose indicated. When applied to controlling the feed of the electrode or of the work in electric welding apparatus, the invention enables alternating current to be used in the arc circuit whereby the use of devices for converting the usual alternating current supply to direct current is obviated. It will be evident, however, that the invention may be used with direct current if so desired.

The invention comprises an electro-magnet connected into the circuit of the apparatus and arranged to act in opposition to a spring weight or like yielding device in operating a valve or other control member whereby the operation of the control member is automatically governed by the magnetic force exerted by the electro-magnet upon the control member against the mechanical resistance offered thereto by said spring weight, or like device.

In applying the invention to electric arc welding apparatus the electro-magnet is preferably arranged to move the valve or control member towards a position of maximum feed of the electrode or the work, while the resistance offered by the spring or other yielding device against such movement preferably increases in proportion to the increase in the magnetic attraction of the electro-magnet as the control member approaches its maximum feed position so as to maintain a substantially constant arc and ensure a uniform weld.

The yielding device may advantageously comprise two separate springs arranged to offer a two stage mechanical resistance to the action of the electro-magnet. One spring may be operatively connected to the control member so as to tend to hold same in a neutral or non-feeding position while the other spring, which is of a comparatively delicate or sensitive nature, comes into action after the control member has been moved from the neutral position and supplements the resistance of the first spring in order to counteract the acceleration of the magnetic force between the poles of the electro-magnet as the distance between them lessens.

By providing for adjustment of the spring or springs and also, if desired, of the electro-magnet, it is possible to so set the various parts that an exceedingly sensitive control is exercised over the feeding movements whereby the welding arc may be maintained substantially constant thus ensuring a uniform weld.

According to another embodiment, a weight may be arranged so as to yieldingly hold the control member in a neutral position against the influence of the electro-magnet, and, if it is desired to provide for a two stage resistance to the action of the electro-magnet, a spring may be arranged to supplement the influence of the weight as the control member is approaching a maximum feed position.

Owing to the extremely sensitive control of the electrode feed provided by the electro-magnet and the cooperating spring or equivalent device in accordance with the invention, an alternating welding current, the use of which is not usually regarded as practicable in automatic arc welding machines, may be effectively employed, the effect of the alternations in the welding current at the arc being counteracted so that the welding operation is not detrimentally affected thereby.

Referring to the drawings which form part of this specification—

Figures 1, 2, 3:
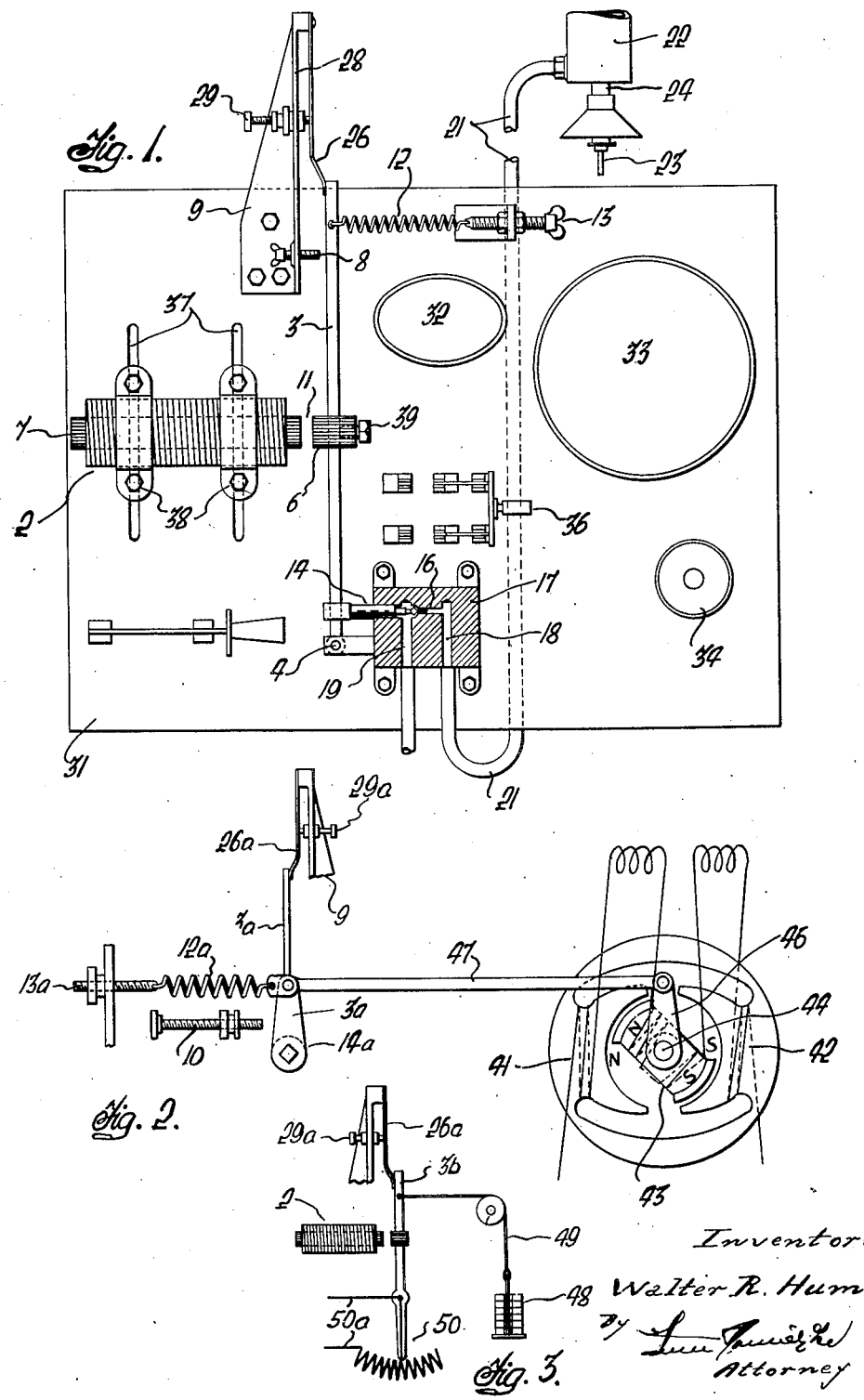
Figure 1 illustrates an electro-magnetic control device in accordance with one embodiment of the invention particularly suitable for controlling the feed of the electrode of an electric arc welding machine.
Figure 2 illustrates another embodiment wherein an oscillating or semi-rotary magnet is employed.
Figure 3 illustrates modifications wherein the yielding device includes a weight and a spring or like stop, and the control member consists of a rheostat.

In accordance with the embodiment illustrated in Figure 1 an electro-magnet 2 of the wound bar type is connected into the welding circuit and is arranged adjacent a lever 3 pivoted as at 4 and carrying a magnetic block 6 arranged opposite and adjacent to one end of the magnet core 7.

Associated with lever 3 is a screw or other adjustable stop 8 mounted on bracket 9 and adapted to limit the movement of lever 3 towards the electro-magnet and to prevent block 6 from contacting with core 7 so that an air gap 11 is always maintained between the block and the core.

Acting upon lever 3 in opposition to the electro-magnet is a spring 12 provided with screw adjusting means 13 whereby the tension of the spring may be regulated as desired.

The lever 3 is suitably connected with the control member by which the feeding movement of the electrode and/or the traversing of the work piece is controlled. This control member may consist of a suitable valve adapted to regulate the flow of hydraulic fluid to or from an hydraulic feed mechanism, as disclosed, for instance, in prior Australian Patents Nos. 7,414/1927 or 19,996/1924, by which the electrode may be fed towards the work and, if desired, the work may be traversed in relation to the electrode. Alternatively the said control member may take the form of a rheostat or other electrical device for controlling the feed motion as desired.

In Figure 1 the control member is constituted by a needle valve 14 which is connected to the lever 3 adjacent its pivot 4 and projects into a passage 16 of a valve casing 17, the passage 16 bridging inlet and outlet fluid passages 18 and 19. A pipe 21 may extend from an hydraulic cylinder 22 to inlet passage 18 so that the extent of the opening of the needle valve 14 governs the rate of escape of fluid from the cylinder and thus regulates the rate of descent or feeding movement of the electrode 23 which is connected to the ram or plunger rod 24. A rubber or like sleeve (not shown) may be placed over the conical end portion of the needle valve to ensure leak proof closure when the valve is shut.

Fluctuations in the welding circuit due to variations in the arc length or other causes are simultaneously experienced by the electro-magnet 2 which, acting against spring 12, serves to operate the control member 14 accordingly and thus automatically control the electrode and/or work feed so that a substantially constant arc is maintained.

Whilst a single spring 12 may be used as beforementioned it has been found by experiment that most satisfactory results are obtainable by the use of a second spring or yielding stop 26 also acting in opposition to the electro-magnet and arranged to come into action after the control member 14 has been moved into an open or feeding position. The second spring thus affords a supplementary mechanical resistance to action of the electro-magnet which counteracts the acceleration of the magnetic force between the magnet core 7 and the block 6 as the distance between them lessens. The second spring 26 preferably consists of a plate or leaf arranged to engage the outer end portion of lever 3. The spring 26 may be anchored at one end to bracket 9 which has a slot 28 extending lengthwise of the spring, the slot slidably accommodating an adjusting screw 29 which bears against the back of the spring.

The foregoing parts (with the exception of the hydraulic cylinder 22) may be suitably mounted upon a board or panel 31 bearing a voltmeter 32, an ammeter 33, switches 34, 36, and any other desired elements, the board being disposed conveniently to the welding zone so that the operator may make any desired adjustments while having the arc under observation.

Sufficient range of adjustment may in many instances be obtainable by providing for adjustment of the springs 12, 26, as aforesaid, but to still further extend the range of adjustment the electro-magnet 2 and the block 6 may be bodily adjustable lengthwise of the lever 3. For this purpose the board 31 may have slots 37 to adjustably accommodate the bolts or screws 38 for holding the electromagnet to the board, while the block 6 may be a loose fit on lever 3 and held in any desired adjusted position by a set screw 39.

According to the embodiment illustrated in Figure 2 we employ an oscillating magnet having two electro-magnetic fields 41, 42, and a shuttle wound armature 43 without a commutator. The armature coil and the field coil windings may be direct connected as indicated diagrammatically but if desired the respective ends of the armature coil may be attached to separate slip rings fitted to the armature spindle 44 and the field coil windings may be connected by brushes to said slip rings.

The armature spindle may have an arm 46 connected by a link 47 with a lever 3a for operating the valve or control member 14a. An adjustable stop 10 and a first or main spring 12a with adjusting means 13a may be associated with the lever 3a. If desired a second or supplemental spring 26a with an adjusting screw 29a may coact with the outer end portion of lever 3a, but this second spring may be dispensed with as the magnet loses strength when approaching a dead centre position.

The operation of this embodiment is similar to that of the embodiment of Figure 1. The position of the armature 43 in relation to the field depends upon the voltage of the supply and the strength or mechanical resistance of the spring or springs. When the current is switched on the armature is turned in a clockwise direction due to magnetic influence and thereby opens the valve 14a, the movement being retarded by spring 12a supplemented if desired by spring 26a, the spring or springs being appropriately adjusted to afford the desired resistance. As the device is connected into the welding circuit the control of the feeding movement of the electrode or the work is automatic.

In Figure 3 the main spring 12, 12a, is replaced by a weight 48 connected to one end of a flexible line 49 which passes upwardly over a pulley and is attached to lever 3b. Weight sections may be added to or removed from the weight 48 to thereby vary the force acting on the lever 3b in opposition to that of the electro-magnet 2.

The control member indicated in Figure 3 takes the form of a rheostat 50 which may be connected in an independent circuit 50a to thereby regulate the passage of current to an electric motor or other element to be controlled.

Figure 4:
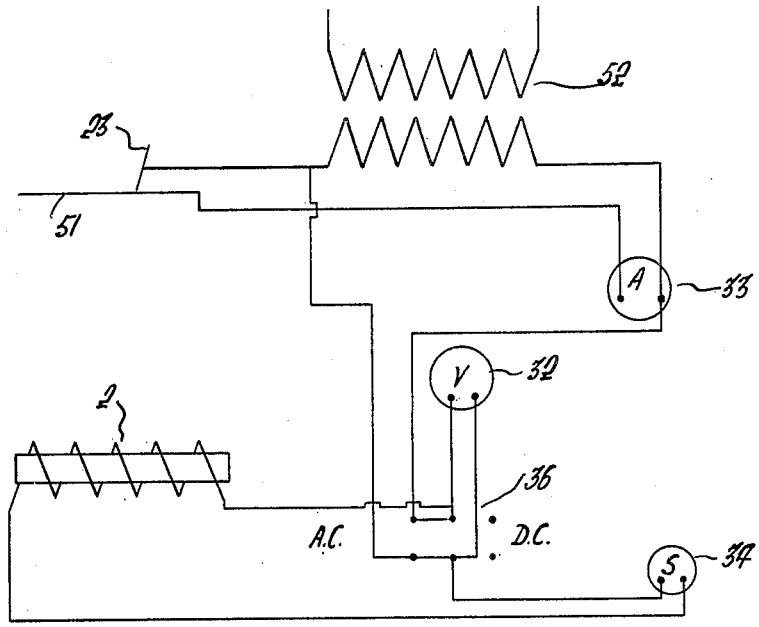
Figure 4 is a wiring diagram of welding apparatus embodying the control device and arranged to operate on alternating current.
Figure 5:
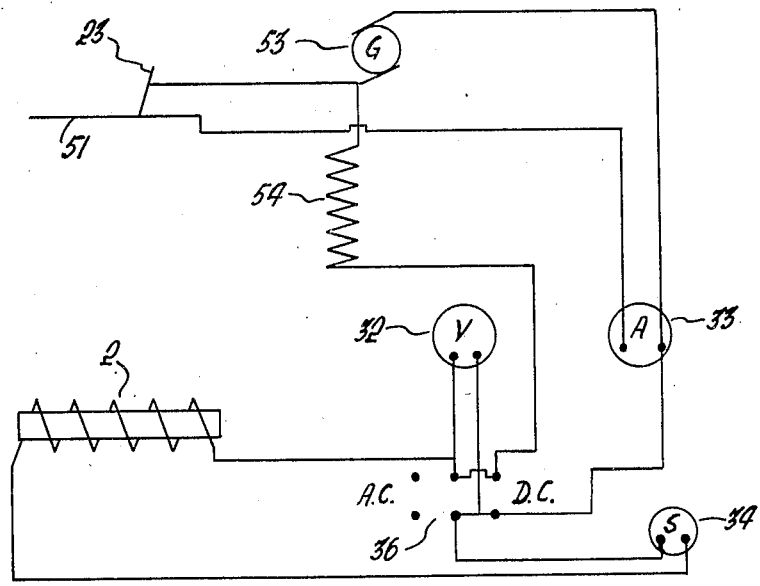
Figure 5 shows the wiring diagram of Figure 4 altered to enable direct current to be used for the welding circuit.

In the wiring diagrams of Figures 4 and 5 the numeral 23 indicates the electrode, 51 the work, 2 the electro-magnet, 32 a voltmeter, 33 an ammeter, 34 a starting switch and 36 a double pole switch for changing from alternating current to direct current. In Figure 4 the numeral 52 indicates a transformer while in Figure 5, 53 indicates a D. C. generator and 54 a resistance in series with the electro-magnet.

Having now described my invention what I claim as new and desire to secure by Letters Patent is—

1. In electric arc welding apparatus, an electro-magnetic control device for controlling the feed of the electrode, comprising an electro-magnet connected into the welding circuit and arranged to act upon a control member so as to move it from a neutral or nonfeeding position towards a position of maximum feed, a spring acting upon the control member so as to yieldingly oppose its movement from the nonfeeding position, and a second spring arranged to come into action as the control member approaches its maximum feed position to thereby supplement the resistance of the first mentioned spring.

2. In electric arc welding apparatus, an electro-magnetic control device for controlling the feed of the electrode and the like, comprising a control member operatively connected to the electrode, yielding means tending to resist movement of said control member from a neutral or nonfeeding position, and a wound bar electro-magnet connected into the welding circuit and adapted to move said control member by magnetic influence into a feeding position in opposition to said yielding means, the yielding means comprising a spring tending to hold said control member in a neutral or nonfeeding position, and a second spring of a comparatively delicate nature arranged to come into action to supplement the first-mentioned spring after its resistance has been partially overcome by the influence of the electro-magnet.

3. In electric arc welding apparatus, an electro-magnetic control device for controlling the feed of the electrode and the like, comprising a control member operatively connected to the electrode, yielding means tending to resist movement of said control member from a neutral or nonfeeding position, and a semi-rotary or oscillating electro-magnet connected into the welding circuit and adapted to move said control member by magnetic influence into a feeding position in opposition to said yielding means, the yielding means comprising a spring tending to hold said control member in a neutral or nonfeeding position, and a second spring of a comparatively delicate nature arranged to come into action to supplement the first-mentioned spring after its resistance has been partially overcome by the influence of the electro-magnet.

4. In electric arc welding apparatus, an electro-magnetic control device for controlling the feed of the work, comprising an electro-magnet connected into the welding circuit and arranged to act upon a control member so as to move it from a neutral or nonfeeding position towards a position of maximum feed, a yielding member acting upon the control member so as to yieldingly oppose its movement from the nonfeeding position, and a second yielding member arranged to come into action as the control member approaches its maximum feed position to thereby supplement the resistance of the first-mentioned yielding member.

5. In electric arc welding apparatus, an electro-magnetic control device for controlling the feed of the electrode and the like, comprising a control member operatively connected to the electrode, yielding means tending to resist movement of said control member from a neutral or nonfeeding position, and a wound bar electro-magnet connected into the welding circuit and adapted to move said control member by magnetic influence into a feeding position in opposition to said yielding means, the yielding means comprising a weight tending to hold said control member in a neutral or nonfeeding position, and a spring of a comparatively delicate nature arranged to come into action to supplement the weight after its resistance has been partially overcome by the influence of the electro-magnet.

6. In electric arc welding apparatus, an electro-magnetic control device for controlling the feed of the electrode and the like, comprising a control member operatively connected to the electrode, yielding means tending to resist movement of said control member from a neutral or nonfeeding position, and a semi-rotary or oscillating electro-magnet connected into the welding circuit and adapted to move said control member by magnetic influence into a feeding position in opposition to said yielding means, the yielding means comprising a weight tending to hold said control member in a neutral or nonfeeding position, and a spring of a comparatively delicate nature arranged to come into action to supplement the weight after its resistance has been partially overcome by the influence of the electro-magnet.

7. An electro-magnetic control device for use in connection with arc welding or other apparatus, comprising a control member, an electro-magnet connected into an arc welding circuit and adapted to move said control member in one direction, and yielding means arranged to offer two stages of resistance to the operation of the control member by said electro-magnet, the first stage tending to hold said control member in one of its extreme positions, and the second stage coming into effect after the control member has been moved from said extreme position, to thereby supplement the first stage and counteract acceleration of the magnetic force between the poles of the magnet as the distance between them lessens.

8. An electro-magnetic control device for use in connection with arc welding or other apparatus, comprising a control member, associated means for moving said control member in one direction, an electro-magnet connected into an arc welding circuit and adapted to move said control member in an opposite direction against the influence of said means, and a relatively sensitive spring arranged to function as said control member nears its extreme position in the last mentioned direction to thereby yieldingly oppose the movement of the control member into such position.

9. An electro-magnetic control device for controlling the rate of feed of an electrode or the work in electric arc welding apparatus, comprising an electro-magnet connected into the welding circuit and acting against mechanical resistance upon a control member operatively connected to the electrode to thereby move said control member towards a maximum feed position, and a spring independent of said mechanical resistance and arranged to yieldingly oppose said movement of the control member and thereby counteract the increased attraction of said electro-magnet as said control member approaches said maximum feed position.

10. Apparatus according to claim 8 wherein said spring consists of a leaf spring.

11. Apparatus according to claim 8 in combination with means for adjusting the pressure or force of said spring.

12. A device according to claim 7 in combination with means for adjusting said yielding means.

13. In automatic arc welding apparatus, electrode feeding means having a control member yieldingly held in a neutral or zero position, a fixed core electro-magnet connected into an alternating current welding circuit and arranged to exert magnetic influence on said control member in accordance with alternations in the welding circuit and fluctuating conditions at the arc, to thereby move said control member away from its zero or neutral position, and a normally inactive spring arranged to come into action when the control member is nearing its maximum position to thereby yieldingly oppose continued movement of the control member.

W. R. HUME.